United States Patent
McAteer et al.

(10) Patent No.: US 9,336,306 B2
(45) Date of Patent: May 10, 2016

(54) AUTOMATIC EVALUATION AND IMPROVEMENT OF ONTOLOGIES FOR NATURAL LANGUAGE PROCESSING TASKS

(71) Applicant: International Business Machines Corporation, Armonk, NY (US)

(72) Inventors: Seamus R. McAteer, Navan (IE); Daniel J. McCloskey, Dublin (IE); Mikhail Sogrin, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 14/221,392

(22) Filed: Mar. 21, 2014

(65) Prior Publication Data

US 2015/0269139 A1    Sep. 24, 2015

(51) Int. Cl.
G06F 17/27 (2006.01)
G06F 17/30 (2006.01)

(52) U.S. Cl.
CPC ...... G06F 17/30734 (2013.01); G06F 17/2785 (2013.01)

(58) Field of Classification Search
CPC ... G06F 17/2785; G06F 17/27; G06F 17/278; G06F 17/30734
See application file for complete search history.

(56) References Cited

U.S. PATENT DOCUMENTS

| | | | |
|---|---|---|---|
| 5,778,157 A * | 7/1998 | Oatman | G06N 5/04 704/9 |
| 7,953,754 B2 | 5/2011 | Cunnane et al. | |
| 2008/0263038 A1 | 10/2008 | Judge et al. | |
| 2008/0270120 A1 * | 10/2008 | Pestian | G06F 17/2785 704/9 |
| 2009/0287678 A1 | 11/2009 | Brown et al. | |
| 2010/0223292 A1 * | 9/2010 | Bhagwan | G06F 17/278 707/780 |
| 2011/0066587 A1 | 3/2011 | Ferrucci et al. | |
| 2011/0087670 A1 * | 4/2011 | Jorstad | G06F 17/277 707/741 |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2015/0269139 A1 * | 9/2015 | McAteer | G06F 17/30734 704/9 |

OTHER PUBLICATIONS

Laclavik et al. "Emails as graph: relation discovery in email archive." Proceedings of the 21st international conference companion on World Wide Web. ACM, 2012.*

(Continued)

*Primary Examiner* — Samuel G Neway
(74) *Attorney, Agent, or Firm* — Stephen J. Walder, Jr.; Reza Sarbakhsh

(57) ABSTRACT

Mechanisms are provided for modifying an ontology for use with a natural language processing (NLP) task. A model of the ontology is obtained that comprises nodes representing concepts of the ontology and edges between nodes representing relationships between associated nodes of the ontology. A spreading activation operation is performed on the model of the ontology with the spreading activation operation matching a portion of a textual source to a matching node of the model and identifying related nodes to the matching node through edges of the model associated with the matching node to thereby generate an activation network. The activation network is evaluated with regard to a chosen NLP task to determine a performance metric for the NLP task associated with the nodes of the model. Based on the results, one of the model or a configuration of the activation network may be modified.

20 Claims, 7 Drawing Sheets

(56) References Cited

OTHER PUBLICATIONS

Laclavik, Michal. Discovering Entity Relations in Semantic Text Graphs. Diss. Habilitation thesis submitted for the Associate Professor degree, submitted in Feb. 2013.*

Agirre, Eneko et al., "Graph-based Word Sense Disambiguation of biomedical documents", Bioinformatics, Original Paper, vol. 26, No. 22, Oct. 7, 2010, pp. 2889-2896.

Fang, Jennifer et al., "Evaluating Ontologies: Towards a Cognitive Measure of Quality", 2007 Eleventh International IEEE EDOC Conference Workshop, Oct. 15-16, 2007, 8 pages.

High, Rob, "The Era of Cognitive Systems: An Inside Look at IBM Watson and How it Works", IBM Corporation, Redbooks, Dec. 12, 2012, 16 pages.

Jimeno-Yepes, Antonio et al., "Knowledge-based and Knowledge-lean Methods Combined in Unsupervised Word Sense Disambiguation", IHI' 12, Jan. 28-30, 2012, ACM 2012, 4 pages.

Judge, John et al., "Galaxy: IBM Ontological Network Miner", Proceedings of the 1st Conference on Social Semantic Web (CSSW), Sep. 26-28, 2007, 4 pages.

Ma, Yinglong et al., "A Graph Derivation Based Approach for Measuring and Comparing Structural Semantics of Ontologies", IEEE Transactions on Knowledge and Data Engineering, vol. 26, No. 5, May 2014, pp. 1039-1052.

McInnes, Bridget et al., "Knowledge-based Method for Determining the Meaning of Ambiguous Biomedical Terms Using Information Content Measures of Similarity", In Proceedings of the Annual Symposium of the American Medical Informatics Association, Oct. 22-26, 2011, pp. 895-904.

Rayfield, Jem, "BBC World Cup 2010 dynamic semantic publishing", www.bbc.co.uk/blogs/bbcinternet/2010/07/bbc_world_cup_2010_dynamic_sem.html, Jul. 12, 2010, 8 pages.

Rodriguez, D. et al., "Empirical Findings on Ontology Metrics", Expert Systems with Applications, vol. 39, Issue 8, Jun. 15, 2012, 15 pages.

Sporns, Olaf, "Graph Theory Methods for the Analysis of Neural Connectivity Patterns", Department of Psychology, Indiana University, Chapter 12, Neuroscience Databases, 2003, 15 pages.

Vrandecic, Denny et al., "How to Design Better Ontology Metrics", Proceedings 4th European Semantic Web Conference, ESWC 2007, Innsbruck, Austria, Jun. 3-7, 2007,15 pages.

Wessam, Gad El-Rab et al., "Analyzing the impact of UMLS relations on word-sense disambiguation accuracy", The 3rd International Conference on Current and Future Trends of Information and Communication Technologies in Healthcare, Procedia Computer Science 21, Oct. 21-24, 2013, pp. 295-301.

Wessam, Gad El-Rab et al., "Biomedical Text Disambiguation using UMLS", 2013 IEEE/ACM International Conference on Advances in Social Networks Analysis and Mining (ASONAM), Aug. 25-28, 2013, 5 pages.

Wessam, Gad El-Rab et al., "Unsupervised Graph-based Word Sense Disambiguation of Biomedical Documents", IEEE 15th International Conference on e-Health Networking, Application & Services (Healthcom), Oct. 9-12, 2013, 4 pages.

Yuan, Michael J., "Watson and healthcare, How natural language processing and semantic search could revolutionize clinical decision support", IBM developerWorks, IBM Corporation, Apr. 12, 2011, 14 pages.

* cited by examiner

AUTOMATIC EVALUATION AND IMPROVEMENT OF ONTOLOGIES FOR NATURAL LANGUAGE PROCESSING TASKS

BACKGROUND

The present application relates generally to an improved data processing apparatus and method and more specifically to mechanisms for automatic evaluation and improvement of ontologies for natural language processing tasks.

Natural language processing (NLP) is a field of computer science, artificial intelligence, and linguistics concerned with the interactions between computers and human (natural) languages. As such, NLP is related to the area of human-computer interaction, and especially with regard to natural language understanding that enables computers to derive meaning from human or natural language input.

Many NLP systems make use of ontologies to assist in performing NLP tasks. An ontology is a representation of knowledge. A semantic ontology, in the case of NLP, is a representation of knowledge of the relationships between semantic concepts. Created by humans, usually by domain experts, ontologies are never a perfect representation of all available knowledge. Often they are very biased to a particular subarea of a given domain, and often reflect the level of knowledge or attention to detail of the author. Ontologies are usually task inspired, i.e. they have some utility in terms of managing information or managing physical entities and their design reflects the task for which their terminology is required. Generally speaking, the tasks hitherto targeted have not been focused on the needs of applications for cognitive computing or natural language processing and understanding.

Ontologies are often represented or modeled in hierarchical structures in which portions of knowledge may also be represented as nodes in a graph and relationships between these portions of knowledge can be represented as edges between the nodes. Examples of structures such as taxonomies and trees are limited variations, but generally speaking, ontology structures are highly conducive to being represented as a graph.

Examples of such semantic ontologies include the Unified Medical Language System (UMLS) semantic network for the medical domain, RXNORM for the drug domain, Foundational Model of Anatomy (FMA) for the human anatomy domain, and the like. The UMLS data asset, for example, consists of a large lexicon (millions) of instance surface forms in conjunction with an ontology of concepts and inter-concept relationships in the medical domain.

Although semantic ontologies provide a mechanism for encoding human knowledge of relationships between semantic concepts, the degree to which these ontologies represent the entire scope of semantics in a target domain is questionable at best. Assessing how closely ontologies match the semantics of natural language text is extremely difficult to accomplish. This is especially true when one considers that many ontologies used in natural language processing (NLP) may not originally have been designed for such NLP tasks.

The problem of assessing ontologies is further exacerbated by the fact that few ontologies offer large enough scope to cater to an entire natural language domain, e.g., a medical domain, a financial domain, or the like. Thus, merging multiple ontologies has become commonplace. The collective semantics of multiple source ontologies can often overlap inconsistently and negotiation of the meaning in the ontologies, so that the associated set of concepts and relationships between concepts in the ontology remains balanced, is a critical task. However, the task of merging ontologies is usually reserved for groups of human domain experts who focus on those parts of the ontology in which they specialize. These human domain experts must painstakingly map each individual concept between component data sets, while attempting to ensure that semantic integrity is preserved. Coordinating the process of collaborative editing and merging of ontologies is a significant problem.

For example, UMLS is composed of approximately 100 different source ontologies or terminologies, each of which have their own labels, descriptions, and semantic perspective (e.g., FMA for the human body and RXNORM for drugs, which are both part of UMLS). The process of adapting this resource for use in NLP tasks, such as word-sense disambiguation, is problematic for the reasons noted above.

SUMMARY

In one illustrative embodiment, in a data processing system comprising a processor and a memory, for modifying an ontology for use with a natural language processing (NLP) task. The method comprises obtaining, by the data processing system, a model of the ontology. The model of the ontology comprises nodes representing concepts of the ontology and edges between nodes representing relationships between associated nodes of the ontology. The method further comprises performing, by the data processing system, a spreading activation operation on the model of the ontology. The spreading activation operation matches a portion of a textual source to a matching node of the model and identifies related nodes to the matching node through edges of the model associated with the matching node to thereby generate an activation network. The method also comprises evaluating, by the data processing system, the activation network with regard to a chosen NLP task to determine a performance metric for the NLP task associated with the nodes of the model. Moreover, the method comprises, in response to results of the evaluating indicating that performance of a node does not meet a desired performance for the NLP task, modifying at least one of the model or a configuration of the activation network based on results of the evaluation of the activation network.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be under

DETAILED DESCRIPTION

Figure 1:
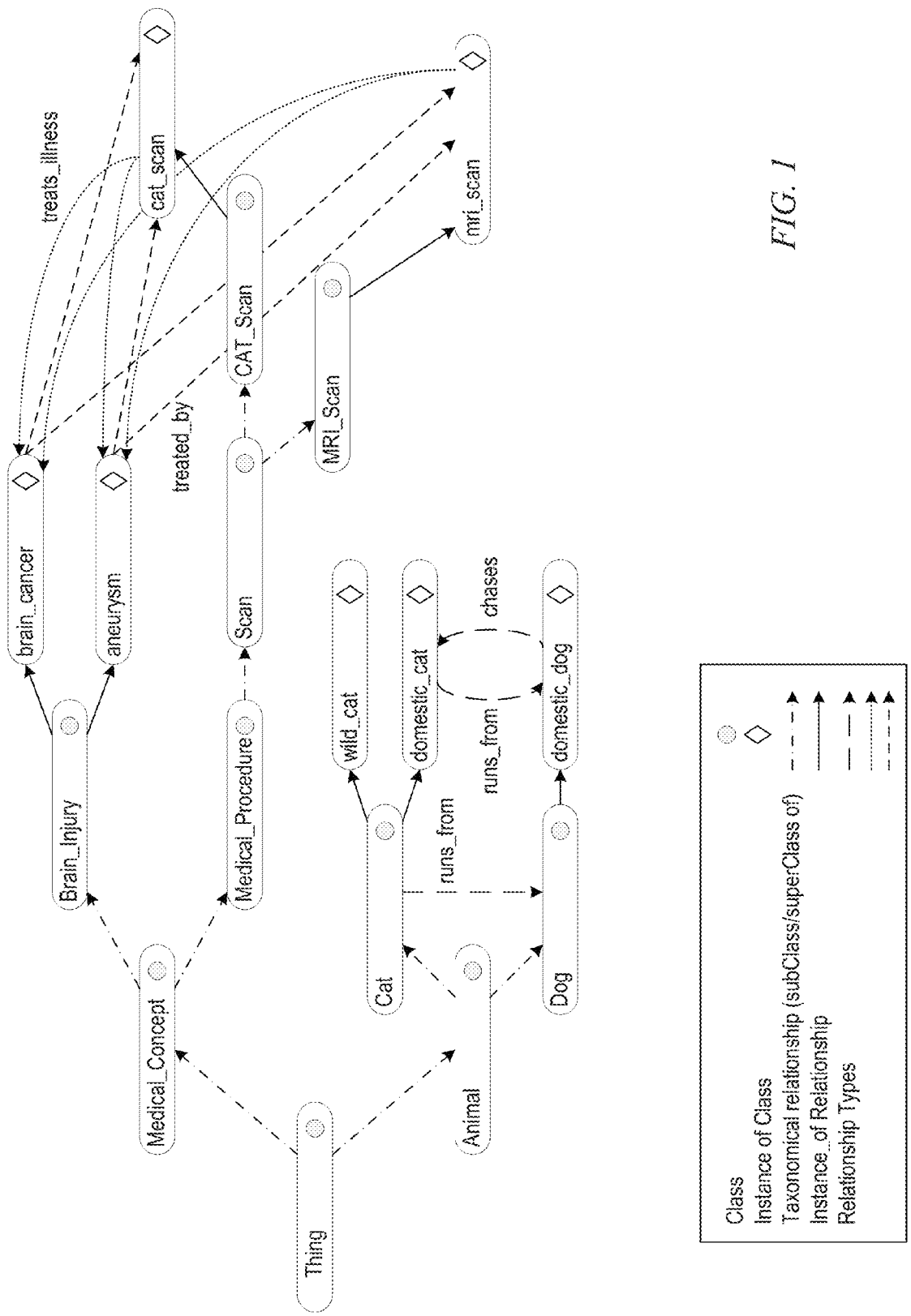
- FIG. 1 illustrates one example of an ontology with classes, semantic relationships between classes, and associated instances of classes and relationships in accordance with one illustrative embodiment.

The illustrative embodiments provide mechanisms for evaluating ontology relevance to natural language processing tasks. That is, the illustrative embodiments provide mechanisms for assessing the relevance of an ontology to a particular natural language processing (NLP) task within a domain of interest using a spreading activation methodology. This same methodology may be used to improve the model, e.g., graph representation, of the ontology for use with a chosen NLP task, as well as to iteratively assess the semantic integrity of that improvement, where semantic integrity is represented by the performance of the activation profile of affected concepts.

In particular the illustrative embodiments involve a methodology, and hardware and/or software logic implementing the methodology, in which a model, such as a graph or "network" based representation, of an ontology is generated. The term "graph" refers to a mathematical formalism for describing any abstract set of concepts and their linkages. Within this model, nodes are instances of semantic concepts and edges are inter-concept relationships or semantic links. For purposes of the following description, it will be assumed that the model is a graph representation, also referred to simply as a graph, however it should be appreciated that any model which provides an indication of concepts and their relationships may be used without departing from the spirit and scope of the illustrative embodiments. The graph of the ontology can be generated from any source containing definitions of ontology concepts and relationships and their instances, e.g., UMLS data persisted in DB2, or an RDF triple store.

The instances of the ontology concepts are annotated in a textual source. That is, terms in a textual source are annotated with annotation metadata indicating the concepts with which those terms correspond. It should be appreciated that when the word "term" or "terms" is used herein, this refers to one or more words, portions of text, or the like, that represent an instance of a concept. Thus, a "term" is not necessarily limited to a single word, although it may be a single word, and may in fact represent a string of words, sentences, or even large portions of text.

The graph representation is "activated" with concepts found in the annotations of the textual source, i.e. concepts identified in an input text are matched to nodes corresponding to these concepts in the model, or graph representation, of the ontology. The term "activated" as it is used herein is based on the use of this term in the field of cognitive psychology and, in the context of the present description, refers to the matching of concepts in the textual source with concepts in the graph of the ontology and updating data associated with the matched nodes of the graph of the ontology (network). That is, in the field of cognitive psychology, "activation" refers to the manner by which electrical signals propagate through the network of neurons in the brain. Thus, when a neuron is stimulated by an electrical stimulus, i.e. activated, the electrical signal is then propagated to other neurons, thereby identifying associations, through a spreading operation in which other neurons are activated with the activation signal dissipating as it spreads. This biological operation may be modeled using the mechanisms of the illustrative embodiments, in a model of an ontology by stimulating a node of the model through a matching operation (activation) and that stimulation being spread through a spreading activation operation to related nodes of the model using the edges of the model representing the relationships between nodes.

The concepts discovered by way of this activation are used as starting points from which to perform a spreading activation operation. That is, using the matched node(s) in the graph of the ontology, nodes are traversed outward through the graph to identify related nodes. This traversal dissipates the further the activated nodes are from the starting node, i.e. the strength, or weight, of the "activation signal" dissipates as it is propagated further from the starting node.

The graph representation of the ontology can be activated, or matched, using instances discovered in text via lexical analysis or any form of lexical annotation, such as manually annotated corpora, for example, which are then linked to the appropriate nodes in the graph, by mapping between the lexical annotations and the semantic categories in the ontology.

The spreading activation algorithm used may be any suitable spreading activation algorithm. For example, examples of spreading activation algorithms are described in commonly assigned U.S. Pat. No. 7,953,754 issued to Cunnane et al. and entitled "Method and System for Finding the Focus of a Document" and U.S. Patent Application Publication No. 2008/0263038 by Judge et al. and entitled "Method and System for Finding a Focus of a Document", which are hereby incorporated by reference. Moreover, an example of a spreading activation algorithm that may be implemented in the mechanisms of the illustrative embodiments is the Galaxy tool, available from International Business Machines (IBM) Corporation of Armonk, N.Y., which identifies the central or focus node of a document or portion of text by identifying the most highly activated node after activation.

The Galaxy tool (also referred to as IBM LanguageWare Miner for Multidimensional Socio-Semantic Networks) is an ontological network miner designed for the Nepomuk project by the IBM LanguageWare Team for application to tasks in social semantic computing. The Galaxy tool uses a spreading activation algorithm to perform clustering on semantic networks. Instead of the traditional method of hard clustering, which partitions a graph into different groups, Galaxy performs soft clustering, which involves identifying a sub-graph based around a set of input nodes, and finding the focus of this sub-graph. The method can be applied to social networks, company organization charts, or any other set of graph-structured data. Initially, an ontological network of concepts and related terms must be generated based on data provided by the user. Galaxy can then process documents, and identify their main concepts, based on the ontological information. The two main steps to this process are the mapping of lexical terms to concepts, and the location of the main concepts.

The Galaxy tool takes a piece of text as input, and then maps lexical terms in the text to concepts in the ontological network. If necessary, the topology of the graph is used in disambiguating terms in the document. The concepts which are identified as corresponding to terms in the text act as input nodes for the spreading activation algorithm. The result of the algorithm is a set of focus nodes, which can be interpreted as those nodes which are most central in the sub-graph based around the input set. It should be appreciated that while the Galaxy tool may be used with the mechanisms of the illustrative embodiments to perform the spreading activation operations, as noted above the illustrative embodiments may be used in conjunction with any algorithm that performs spreading activation over a network or graph.

The spreading activation algorithm uses the principle of propagating activation in a graph via its links to identify the focus nodes for a query, where the "query" in the context of the description of the present invention may be a set of nodes corresponding to concepts that were found in text via lexical analysis. The input nodes of a query act as sources of activation "signals" (virtual signals represented by an activation strength value) which propagate, or spread, outwards from their source or input nodes. An activation signal is given an activation strength at the source node and, as the activation signal spreads farther from a source node, the activation signal gets weaker, i.e. a starting activation strength is assigned to the source node and at subsequent nodes that are activated, the activation strength is reduced by an amount corresponding to weights assigned to the nodes/edges in a weighting model corresponding to the graph. If the activation "signal" spreads from multiple nearby source nodes, the activation signals combine and the point at which they overlap will be activated to a greater degree. The nodes which accumulate the most activation are deemed to be the focus nodes. This can be a set of one or more nodes with the highest activation level or levels above a threshold. These levels can be considered as scores for the nodes and used for further reasoning logic.

Galaxy can be used with any kind of graph or tree, and allows for both directed and undirected links. Various parameters can be tuned to alter the behavior of the algorithm. This allows a domain-expert to stipulate the properties of a semantic graph that are most important for a particular task. For example, in a graph with different types of relations, some may be considered more relevant than others, depending on the application. The Galaxy tool allows for link types to be weighted in order to reflect the relative significance of different relationships.

The chosen spreading activation method can be used in NLP tasks, such as word-sense disambiguation (WSD), named entity detection or resolution, named entity or word sense inference, or the like, by scoring the nodes of lexical concepts based on their proximity to a focus node, as well as other features, such as the degree of overlap, presence of alternate unambiguous surface forms (a textual representation of a concept, e.g., "headache", "pain in the head", and "head pain" are all surface forms for the same concept entity), etc. An example of scoring the nodes of a graph using a spreading activation algorithm is described in U.S. Pat. No. 7,953,754 where counters associated with nodes in the ontology graph are incremented based on activations (matches) with the concepts identified as being associated with the terms in the textual source.

The graph, and by extension the ontology, is then evaluated with regard to a specific NLP task, such as a domain-appropriate WSD, named entity detection or resolution, named entity or word sense inference, or the like, leveraging existing metrics such as precision (how many items identified as correct by the system are actually correct) and recall (how many correct items were identified correctly by the system). Precision, using a ground truth table, refers to the ratio of the true positives to the sum of the true positives and false positives (tp/(tp+fp)). Recall, using a ground truth table, refers to the ratio of true positives to the sum of true positives and false negatives (tp/(tp+fn)). Other metrics that may be used include accuracy, F-measure, and other accepted standard metrics in NLP may also be used. These values may be determined by comparison to a ground truth or golden set of data.

The characteristics of nodes of the graph representation which were usually correctly/incorrectly recognized, as determined from the above precision, recall, and other metrics, are identified using a set of appropriate graph metrics, such as number of in-bound links, number of out-bound links, identification of isolated nodes (having 0 in-bound and out-bound links), and the like, for each of these nodes and potentially relationships of these metrics for one node relative to similar metrics for other nodes. For example, the mechanisms of the illustrative embodiments evaluate the graph to identify inherent imbalances in the graph representation, such as "black-hole nodes" which are nodes that are much more highly connected (as measured by a threshold number of links) than the average number of links of other nodes, and which noisily amplify the activation of the ontology graph to such an extent that accuracy/performance in the target NLP task is no longer above a threshold of acceptability, e.g., a node with greater than 100 links may have an overtly negative effect on the outcome of a NLP task given the amount of activation that the node itself attracts during the spreading activation process and thus, may be considered a "black hole" node because of its bias which effectively moves the focus towards the node and is akin to the gravitational pull of a black hole. With regard to an activation spreading algorithm, this would result in falsely amplified focus nodes, reducing the validity of the network, and its semantic relevance to the text being analyzed. The activation tends to gravitate towards the overly connected node. In terms of a WSD NLP task, the correct word sense may not be suggested.

In one illustrative embodiment, equal weights, in a weighting model associated with the graph representation, are assigned to all node classes in the graph representation, where a node can have multiple semantic representations or classes in the ontology, and where a semantic representation or "class" is a concept in a concept ontology represented by a node in the graphical representation. Having applied the ontology graph (network) in conjunction with a spreading activation algorithm to a given NLP task, e.g., word-sense disambiguation, named entity detection or resolution, named entity or word sense inference, or the like, an initial measure of how closely the graph matches the semantics of the target domain is determined using task-specific metrics, such as precision and recall. The nodes in the graph representation for which the activation profile (i.e. the web of activation including the sub-graph of activated nodes and their post-activation weights or semantic scores) was not representative of semantics in the text, e.g., where the correct word-sense was not suggested in a majority of cases, such as may be identified based on the testing metrics mentioned above (e.g., precision, recall, etc. versus a gold-standard or ground truth), as well as those nodes which scored more highly in the NLP task may be identified. Incorporation of robust graph metrics, such as examining the influence of particular nodes in the graph, their connectivity, in/out degree (number of connections), and others, are then applied individually or in combination as indicated by performance on the NLP task, in order to build up a profile of the characteristics of those nodes that correctly reflect usage in the text, as well as those that did not.

For example, the above mentioned testing metrics of precision, recall, F-measure, and the like, may be separately applied to individual cases of ambiguity, e.g., the word "cat" being both an animal and a type of medical scan. In terms of ground truth, a set of examples may be provided where the animal sense is appropriate, and alternatively where the medical scan is the correct sense, and the illustrative embodiments may assess the graph for correctly disambiguating these concepts in context. The illustrative embodiments may then examine the nodes that correspond to various senses of a word and ascertain which properties of the graph caused the good or bad performance with regard to identifying the correct sense. If the node representing the medical scan of "cat" is disambiguated well in appropriate cases, but the node representing the animal sense does not seem to be activated when appropriate, the illustrative embodiments will use clues discovered from the application of graph metrics (described previously) to modify the graph, or the spreading activation algorithm accordingly.

For example, the string "AA" in a medical domain word-sense disambiguation NLP task may have two possible interpretations, i.e. "amino acid" and "Alcoholics Anonymous." It may be discovered in post analysis that one of the interpretations was much more highly connected than the other, which tended to skew the resulting activation. After further examination of the overlap of semantic categories on instances of these nodes, it may be found that reducing the relevance of particular semantic categories consequently reduced the effects of this imbalance. In terms of WSD metrics for the term "AA", the precision metric for example, may increase for the sense which was previously low scoring.

The graph representation is then modified, such as by re-weighting the influence of particular semantic classes or the relevance of particular inter-class semantic links in a weighting model associated with the graph representation. That is, using the output of the evaluation of the graph representation, the spreading activation algorithm may be reconfigured accordingly, such as by modifying a strength of the activation signal at the source nodes, and the effect on accuracy in the chosen NLP task may be examined, where accuracy may be measured, in terms of a ground truth table, as the sum of the true positives and true negatives to the total of the true positives, true negatives, false positives, and false negatives ((tp+tn)/(tp+tn+fp+fn)). Alternatively, weights in the weighing model associated with the graph representation may be modified to adjust the manner by which activation signal propagation is performed. The graph representation is then re-evaluated with respect to the chosen NLP task, preferably against a new test set of text, and the operations are repeated until a threshold of desired quality, e.g., desired precision, accuracy, recall, F-measure (which is a measure (weighted harmonic mean) indicative of the precision/recall tradeoff), etc. is achieved.

The use of the spreading activation methodology of the illustrative embodiments, in conjunction with the application of comparative graph metrics to a graph which represents an ontology, lends itself to a more direct assessment of the ontology's inherent semantics than is obtained from simply relying on traditional task specific metrics, such as precision and recall over a gold standard corpus. Aside from providing a way to quantify the strength of the relationship between ontology semantics, and semantics in text, the methodology also facilitates the improvement of the graph representation for NLP tasks in the target domain.

Figure 2:
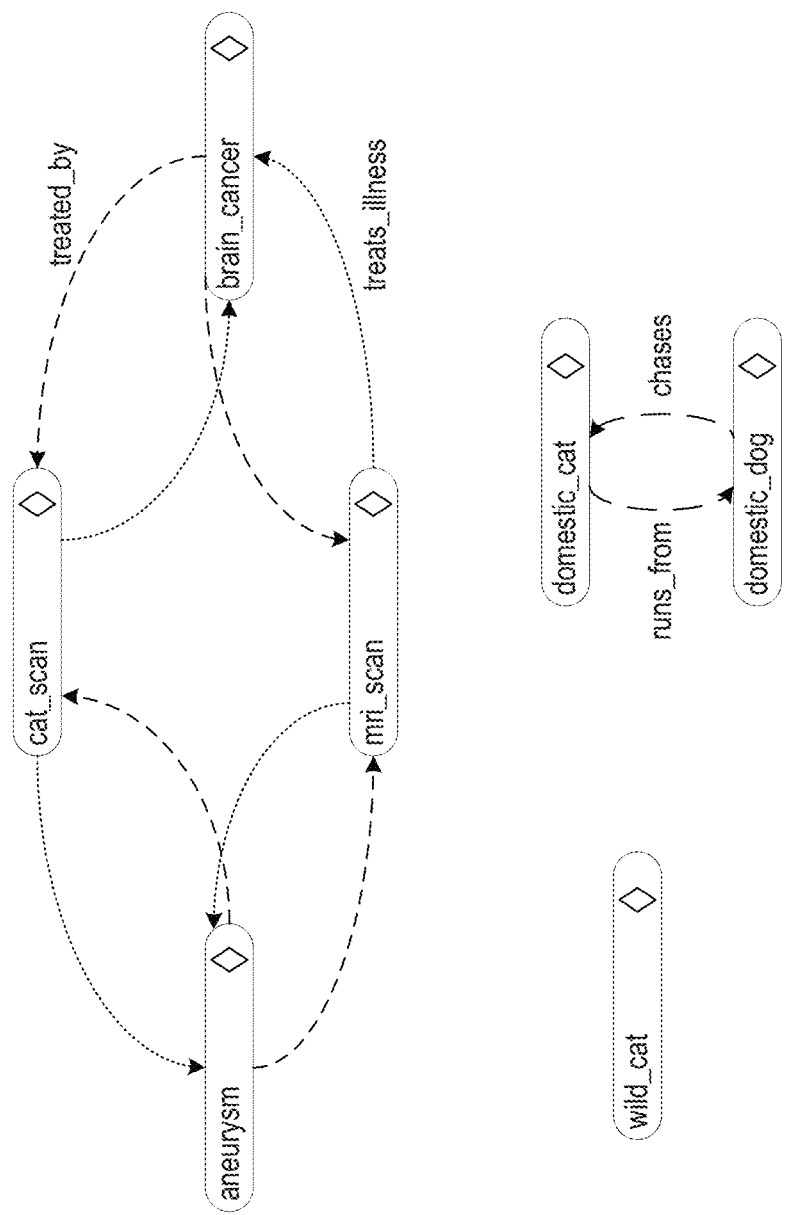
FIG. 2 is an example diagram of a graph or network which would be built from the ontology of FIG. 1.

To illustrate the operation of the illustrative embodiments more concretely, consider the examples shown in FIGS. 1-2 which illustrate an ontology and a graph data structure representative of the ontology, respectively. As discussed above, the illustrative embodiments build a graph of instances of classes of an ontology and thus, it is important to first understand the difference between a class in an ontology and an instance of that class. That is, in an ontology, one might have a class of "left leg", whereas a particular person, Tom, may have a specific instance of that class, i.e. Tom's "left leg", and another person, Jill, may have a second instance of that class, i.e., Jill's "left leg". Unique identifiers (UIDs) may be utilized to distinguish between instances of a class, e.g., one UID may be associated with Tom's "left leg" and another UID may be associated with Jill's "left leg." In the UMLS ontology, a set of global identifiers for recognizing the same instance across all sources, referred to as the "CUI", in the form of C####### (where # represents a digit from 0-9) is utilized. Thus, in one illustrative embodiment utilizing the UMLS ontology as an input, a graph may be generated for instances of classes in an ontology where the nodes are UMLS CUIs and the links between nodes are the semantic relationships between UMLS concepts.

For example, FIG. 1 illustrates one example of an ontology with classes, semantic relationships between classes, and associated instances of classes and relationships in accordance with one illustrative embodiment. In FIG. 1, the ontology classes and semantic relationships between classes may be built or otherwise obtained from an ontology source, such as UMLS, FMA, RXNORM, or the like. The instances of classes and relationships between instances of classes may be obtained by annotating instances of the ontology concepts in a textual source, e.g., a portion of a corpus, test or training textual content, or the like, and applying the ontology to the annotated instances in the textual source.

In FIG. 1, ontology classes are denoted with circle symbols while instances of ontology classes are denoted by diamond symbols. Dotted lines represent taxonomical relationships (subclass/superclass of), while dashed lines represent an "instance_of" relationship. For example, in the depicted example, the dashed line between "Cat" and "Dog" is the relationship "runs_from" indicating that cats "run from" dogs. The links between "domestic cat" and "domestic dog" are instances of the relationship "runs_from" and its corollary "chases" (as in, "dogs chase cats", "cats run from dogs").

FIG. 1 also illustrates a medical ontology in which the link between the class of "CAT_Scan" and "Brain Injury" (and similarly between "MRI Scan" and "Brain Injury") is the relationship "treats_illness". The link between instances of scans and instances of brain injuries are instances of a "treats_illness" relationship. The links with arrows going in the opposite direction of the "treats_illness" relationship links are a corollary, i.e. "treated_by".

It should be appreciated that there is a distinction between the schema or abstract definition of the ontology (classes and relationships) and the instances of the classes and relationships of the abstract definition. The illustrative embodiments of the present invention build a graph of instance data. This is done by either extracting instances from the textual source using Natural Language Processing (NLP) techniques (information retrieval, named entity extraction, and/or the like), or by using the instance data provided in the ontology itself. In the case of UMLS, for example, as noted above, CUI identifiers may be used as instances of UMLS semantic network classes, e.g., "headache" is an instance of the UMLS class SignOrSymptom. It should be appreciated that in the context of the illustrative embodiments, references to a "Class", "Concept", "Semantic Type" and "Semantic Category" are used interchangeably herein, as is also the case with the set of terms "property", "semantic relationship", and "semantic link".

Having built a graphical representation of the instances of classes and relationships of an ontology of a particular domain, e.g., UMLS in the medical domain, using annotated textual source information, the mechanisms of the illustrative embodiments utilize a spreading activation methodology to identify related instances of activated instances in the textual source. The theory of spreading activation is one from cognitive neuroscience. The theory states that when a human is presented with a particular concept or idea, they are automatically primed to think about related concepts/ideas. This theory works on the principal that seemingly-related concepts are semantically linked in some biological neural network, and when one of these ideas is recognized, this stimulates other parts of the brain which store related information. This hypothesis has been leveraged in computer science by building digital networks that represent human knowledge to some degree. Such an artifact can be artificially stimulated by firstly activating a given node in the graphical representation, or network, and then propagating this activation (also referred to as "sending a signal") to the adjacent nodes, which reflects this spreading activation in the human brain. This signal, or propagation of the activation, can be configured (e.g., should it revisit the same node multiple times, how much should it dissipate as it spreads across the network, etc.) in various ways. There are many different implementations of the spreading activation theory, one of which that may be utilized with the illustrative embodiments being described in U.S. Pat. No. 7,953,754 and U.S. Patent Application Publication No. 2008/0263038. Moreover, another example spreading activation mechanism that may be used with the mechanisms of the illustrative embodiments is the Galaxy tool available from IBM Corporation as discussed above.

Since the graph representation, or network, of the illustrative embodiments is built using instances of ontology concepts and relationships, when nodes are activated in the graph or network with an activation input or signal, the mechanisms of the illustrative embodiments discover how the ontology concepts are related to one another. When the graph or network is activated in the context of a particular NLP task (such as word-sense disambiguation) the mechanisms of the illustrative embodiments discover how the original design of the ontology allows different meanings of the same word to be recognized separately.

FIG. 2 is an example diagram of a graph or network which would be built from the ontology of FIG. 1. As shown in FIG. 2, the "cat_scan" instance of the "CAT_Scan" class has a "treats_illness" relationship with the "brain_cancer" instance and "aneurysm" instance which in turn have "treated_by" relationships with the "cat_scan" instance. Similarly, the "mri_scan" instance has a "treats_illness" relationship with the "brain_cancer" and "aneurysm" instances which in turn have a "treated_by" relationship with the "cat_scan" instance. The "domestic_cat" instance and "domestic_dog" instance have corresponding "runs_from" and "chases" relationships as previously discussed above. The "wild_cat" instance of the ontology class "Cat" does not have any relationships with other instances and thus, is an isolated instance.

If an associated vocabulary is built for the instances in the diagram above, such as from a dictionary data structure, related terminology data structure, or any other linguistic resource, one may obtain a vocabulary of the following example type in which terms are associated with instance types:

```
[wild_cat = "lion","tiger", "cats", "cat","cub"]
[domestic_cat= "cat", "cats", "tabby","puss","kitten","feline"]
[domestic_dog="fido","dog","dogs","canine","puppy"]
[brain_cancer= "brain tumour","cancerous tumour in the brain","brain carcinoma"]
[aneurysm="aneurysm","aneurysms"]
[cat_scan= "cat", "cats", "cat scan"]
[mri scan="mri","mris","mri scan"]
```

Now, consider input textual source having the following pieces of text as separate contexts:
Context 1:
Tigers and Lions are a type of cat. They are not afraid of dogs.
Context 2:
Dogs like to chase cats.
Context 3:
The results of a cats for the patient's brain tumour were assessed by the Doctor. Initially, a large amount of overlap is identified in terms of the words "cat" and "cats," i.e. following lexical analysis, it is apparent that there are multiple semantic categories on the same span of text which is analogous to natural language ambiguity. When each of the nodes corresponding to the instances discovered in the text are activated, and the activation is spread using a spreading activation algorithm, i.e. the activation input or signal is spread to adjacent nodes, it is found that there is a better spread for concepts that are more highly connected. That is, concepts that are more highly connected are likely to be revisited by the spreading signal from adjacent nodes, thereby increasing their semantic value (as per the strength of the remainder of the spreading activation signal). This spread of the activation signal can never add weight to nodes which are not connected. For example, in context 1, the text "cat" and "dogs" will cause this piece to be repeatedly activated (since there is a circular set of relationships between these two instances), boosting the semantic value of "domestic_cat" rather than "wild_cat". Since "wild_cat" has no connected nodes, it does not facilitate activation. In graph terms, the "wild_cat" node can be identified as an isolated node. This is a problem in terms of the development of the ontology, as the resulting graph is over-representative of a particular sense of the word "cat". This type of scenario is undesirable for word-sense disambiguation, and other NLP tasks, and can be described as an imbalance in the graph.

Once a graph of instances is built, the illustrative embodiments use the generated graph for NLP tasks, e.g., word-sense disambiguation, such as in the examples above. In computational linguistics, word-sense disambiguation (WSD) is an open problem of natural language processing, which governs the process of identifying which sense of a word (i.e. meaning) is used in a sentence, when the word has multiple meanings. While the description of the illustrative embodiments focuses on WSD as an example of a NLP task, there are many other NLP tasks to which the mechanisms of the illustrative embodiments may be applied, e.g., named entity detection/recognition, word-sense inference, and the like. It is important to note that word-sense disambiguation is a fundamental problem in NLP, and the cost of generating incorrect word-sense disambiguation results in the context of a complex NLP system, such as the IBM Watson™ Question and Answer (QA) system, is very high, resulting in inaccurate answers generated by the QA system and potentially more computation time.

The illustrative embodiments evaluate the ontology indirectly, by evaluating the built graph, since the graph represents the semantics (instances of concepts and relationships) of the ontology. In terms of evaluation, the illustrative embodiments first assess the graph's suitability for the chosen NLP task, e.g., WSD, using a measure of ground truth, e.g., a gold-standard test corpus of disambiguated concepts, or a set of questions and expected correct answers in conjunction with a QA system. In evaluating the graph, illustrative embodiments analyze the accuracy of the output generated with respect to the ground truth, and identifies cases where the output is highly accurate (e.g., disambiguates well, or returns correct answer as top-ranked) versus cases where the output is highly inaccurate. In one illustrative embodiment, metrics from the NLP task may be correlated with static analysis of individual nodes in the graph to thereby provide a strong basis on which to modify the starting weights for graph or activation strategy. In another illustrative embodiment, the static graph analysis by itself may be used as demonstrative of nodes of various characteristics such that the resulting modification of these nodes will have an impact on performance against the overall metric in the gold standard or ground truth.

Using these sets of cases, the illustrative embodiments analyze the graph in the context of nodes which were relevant in the output, and discover characteristics that separate well-performing nodes from poor-performing ones. Nodes are considered to be relevant in the output for further analysis based on the node's presence in the ground truth data set. There will be many nodes that will affect the accuracy of the graph, but the mechanism of the illustrative embodiments focus on the ground truth nodes in order to maximize the quality of results with respect to the standard.

For example, the illustrative embodiments may assess the graph structure using a multitude of graph metrics, including but not limited to: graph connectivity (# of outgoing links from the node), inDegree (# inward links), outDegree (# outward links), isolated nodes (0 outgoing links), etc. The illustrative embodiments may then identify semantic categories (classes) that are associated with these nodes and modify the starting weight of the activation signal for these semantic categories. For example, if the default starting weight of the activation signal is 1 for all semantic categories, the illustrative embodiments can reduce or increase this value depending on how the graph metrics suggest this node is performing relative to other nodes of the graph.

To further illustrate this functionality of the illustrative embodiments, consider the following textual content in a fourth context:

Context 4

The patient survived the brain carcinoma, but died of an allergic reaction to their neighbour's cat.

When the mechanisms of the illustrative embodiments activate the graph in this context, the meaning of cat will be identified as cat_scan due to the surrounding context. The ontology is not sufficiently developed to ensure that the relationship between the animal cat and an allergy is recognized in the text, as there is no concept or relationship linking a cat with an allergy. However, even if one were to add some basic information to the ontology about animal allergies, unless the graph is as equally developed as the section on brain scans, the illustrative embodiments may still need to modify the starting weights of the activation, e.g., to reduce the relevance of brain_scan, to achieve a correct result.

After modifying the starting weights of semantic categories in the graph, the illustrative embodiments may re-evaluate the graph's suitability for the NLP task using another test scenario, or subset of the chosen test data. Generally speaking it makes sense to keep a set of data separate for testing so that the graph is not over-fitted to the specific set of test data.

This process may be performed iteratively until a desired level of accuracy, precision, recall, F-measure, and/or the like is achieved by the NLP task using the graph data structure. Thus, a loop of activating the graph, evaluating the graph, and modifying the graph, with regard to weightings of activation signals, is performed until the evaluation results in a performance metric that satisfies a given threshold performance indicating a desired performance for the system with regard to the particular NLP task.

Thus, through the mechanisms of the illustrative embodiments, an instance graph of an ontology is able to be evaluated in relation to a specific NLP task to determine how well the ontology works for the particular NLP task so that the ontology may be adjusted for use with the particular NLP task. The illustrative embodiments utilize a spreading activation algorithm to perform activation of the graph data structure, i.e. matching of concepts in text to nodes in a graph data structure, where the activation signal has a strength, or weight, and characteristics indicating the manner by which the activation signal is spread through the graph data structure with this initial strength or weight being modified. The strength or weight and characteristics may be different for different classes within the ontology. This weight can be iteratively adjusted based on results generated through activating the graph (or network) and evaluating the activated graph (or network) relative to a "gold standard", i.e. a standard indicative of known results that should be generated. Based on the results of the evaluation, the weights associated with the activation of various classes in the ontology may be adjusted and the process repeated until a desired performance metric is achieved.

Figure 3:
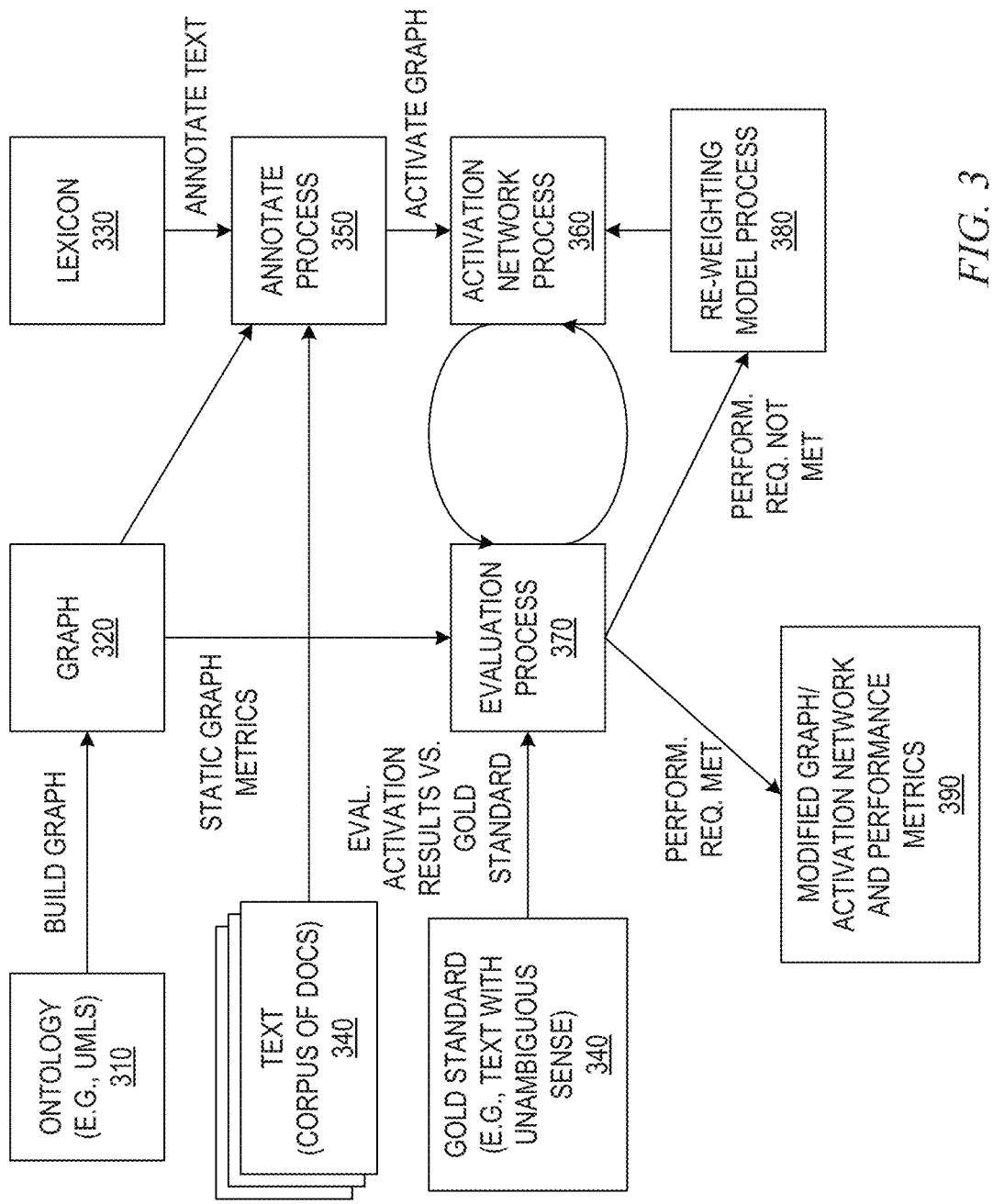
FIG. 3 is an example diagram depicting the overall process performed by the mechanisms of the illustrative embodiments.

FIG. 3 is an example diagram depicting the overall process performed by the mechanisms of the illustrative embodiments. Some elements shown in FIG. 3 that perform operations may be implemented, for example, in hardware logic of one or more computing devices and/or software logic executed by one or more processors of one or more computing devices. Other elements in FIG. 3, such as text, gold standard data, and the like, may be provided as data to the software/hardware logic of the one or more computing devices upon which the operations of the process operate. Moreover elements in FIG. 3 may be alternatively provided by other external systems, such as a QA system for example, with expected correct answers as the "gold standard" data.

As shown in FIG. 3, the process comprises the building of a graph (or network) representation 320 of an input ontology 310, such as a UMLS ontology, that represents the classes of the ontology and relationships between the classes. This graph 320 may be built from an analysis of a textual source, e.g., a corpus of documents, may be a human specified ontology generated by domain experts, or may be a previously generated ontology, such as the UMLS ontology which may have been built up over time. The graph representation 320 represents the ontology 310 as a hierarchical set of nodes and edges between nodes where the nodes represent classes, or concepts, and the edges represent relationships between the classes or concepts.

A lexicon 330 of surface forms is used to annotate a text source 340, e.g., a corpus of documents, via the annotate process 350. The lexicon 330 may be any type of data structure identifying a correspondence between terms used in a text source 340 and classes or concepts in the ontology 310. For example, the lexicon may be as simple as a file containing a list of terms, i.e. surface forms, for individual semantic classes, categories, or concepts. The lexicon 330 may be independently constructed using data from the ontology 310 or another lexicon building process separate and distinct from the ontology 310. It is assumed for purposes of this description that the lexicon 330 is a previously generated data structure that is input to the mechanisms of the illustrative embodiments.

Individual terms in the text source 340 may be annotated to include identifiers of the class to which it corresponds as identified by the lexicon 330, with each instance of the class being given a unique identifier, such as a CUI in UMLS for example. The annotated text is used to activate the graph 320 and apply a spreading activation algorithm to the activations to generate the activation network 360, where the activation network 360 is the subset of nodes of the graph 320 that are activated by the spreading activation algorithm in response to concepts in the annotated text source 340 matching nodes in the graph 320 and this activation of the nodes iteratively spreading to related nodes through edges of the graph 320. The activation network 360 further comprises an activation strategy comprising starting strength or weights to be applied to the matching nodes, i.e. the nodes whose concepts match those specified in the annotated text. It should be appreciated that in order to perform the spreading activation operation to generate the activation network 360, an initial strength, or weight, of the activation of the matching nodes is specified and this initial strength, or weight, is modified as the activation spreads in accordance with a weighting model associated with the graph 320 such that this strength, or weight, dissipates as the activation spreads further from the source, or matching, node. In one illustrative embodiment, the subset of nodes included in the activation network 360 may be identified based on nodes of the graph 320 that have a non-zero activation strength following the spreading activation operation, for example. Thus, the activation network 360 represents the subset of nodes of the graph 320 that are related to concepts identified in the annotated text source 340.

The activation network 360 is evaluated 370 in the manner previously described, against a gold standard 375, e.g., text with unambiguous sense markups in the case of a WSD NLP task, along with static graph metrics obtained from analysis of the graph 320 itself, e.g., number of in-bound links, number of out-bound links, nodes with 0 links, etc., to determine if the ontology 310 performs well with the particular NLP task. That is, the evaluation 370 generates performance metrics, e.g., accuracy, precision, recall, F-measure, and the like, which may be compared against one or more corresponding thresholds to determine if a desired performance is being obtained by using the ontology 310 to perform the particular NLP task. If not, then a re-weighting algorithm 380 is invoked to modify the weights associated with various classes within the graph 320 to modify the manner by which the NLP task is performed using the graph 320, e.g., modifying the initial weights assigned to spreading activation signals in the activation network 360 or weights associated with links or nodes of the graph itself. As shown, this process is iterative with the process returning the activation network stage 360 where the new weights are utilized to model the activation of the various instances of classes in the activation network 360, the evaluation 370 is repeated, and if the threshold performance requirements are met, then the process terminates with the resulting modified activation network and performance metrics 390 being output. The resulting modified activation network 390 may then be utilized when performing the corresponding NLP task during runtime operation.

It should be appreciated that the resulting activation network 360 may be utilized with any NLP task with WSD being only one example of an NLP task. The NLP tasks with which the activation network 360 may be used include NLP tasks performed as part of a QA system pipeline, such as an IBM Watson™ pipeline operation for answering input questions using NLP of a corpus of documents as a source for candidate answers to the input questions. As such, the NLP tasks may be implemented as part of an ingestion operation, question analysis operation, evidence retrieval operation, candidate answer scoring operation, and/or the like.

As previously discussed above, the illustrative embodiments determine the performance of an ontology with regard to a specific chosen NLP task. In FIG. 3, it should be appreciated that the specific chosen NLP task is taken into consideration when annotating the text 340 in element 350, performing activation of the graph in 360, and evaluating the activation results against the gold standard 370. For example, with regard to annotating the text 340 in element 350, the annotation phase may be configured differently depending on the chosen NLP task, e.g., for word-sense disambiguation (WSD), all possible word-senses or only those terms which are ambiguous may be required as input. In named entity extraction, the user may prefer to annotate all possible instances in the text. With regard to performing activation of the network, the activation of the network may be configured to return all relevant concepts, whether or not they are ambiguous. In the context of WSD, the user may decide to only return the most highly weighted concept on the same piece of text. With regard to the evaluation of the activation results, the evaluation mechanism will potentially use different metrics and gold-standards depending on the NLP task. For example, WSD may focus on the standard for ambiguous words whereas named entity recognition may generally focus on the quality of particular semantic categories, such as Diseases or Drug Names. Thus, the particular NLP task is taken into consideration when performing the annotate, activation, and evaluation operations of the illustrative embodiments.

Thus, through the implementation of the mechanisms of the illustrative embodiments, the activation network, or graph, used by a particular NLP task is improved for use by that particular NLP task by identifying portions of the ontology which do not accurately reflect the requirements of the domain and modifying the activation and/or graph of the ontology to generate better results for the NLP task. The identification of portions of the ontology that do not accurately reflect the requirements of the domain is done by using graph metrics to discover which parts of the ontology are inherently problematic, and then these are re-configured in order to correct for these problems. As an example, if it is discovered through the evaluation 370 that 80% of highly accurate nodes have greater than 15 different types of outward semantic relationships in the activation network 360 and/or graph 320, and that 70% of poorly performing nodes have fewer than 5 outward links, this data can be used to modify the activation network 360 or graph 320 and reduce the bias toward the highly performing nodes, while increasing the relevance of poorly performing nodes. For example, this may be done by modifying the starting activation weight for the associated semantic types of these highly accurate and/or poorly performing nodes.

The process shown in FIG. 3 and outlined above can be fully automated where high and low quality nodes may be grouped based on their performance on the NLP task. The differing characteristics for these nodes may be identified with respect to the graph 320. Depending on how these sets of nodes differ, in conjunction with the number of overlapping semantic categories (as may be discovered by using the lexicon in the text and discovering which pieces of text have multiple associated semantic categories or classes, or through static analysis of the graph whose nodes may store information regarding semantic category or class types), the starting weights for the spreading activation algorithm can be proportionately increased/reduced. Furthermore, by evaluating the performance of the activation network 360 using the gold-standard 380 in text as a comparison for the graph of the ontology 320, the illustrative embodiments can identify areas of the ontology 310 which require further development, as well as those which are overly developed compared to other portions of the same resource.

It should be appreciated that the mechanisms of the illustrative embodiments may be applied to any ontology 310, not just the UMLS, RXNORM, or FMA. Moreover, the mechanisms of the illustrative embodiments may be used to fit a semantic graph 320 to any NLP task, not just word-sense disambiguation. Any process involving the identification of concepts in text will benefit from application of the mechanisms of the illustrative embodiments, including the induction of concepts that do not appear in the text at all.

As is clear from the above description, the present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
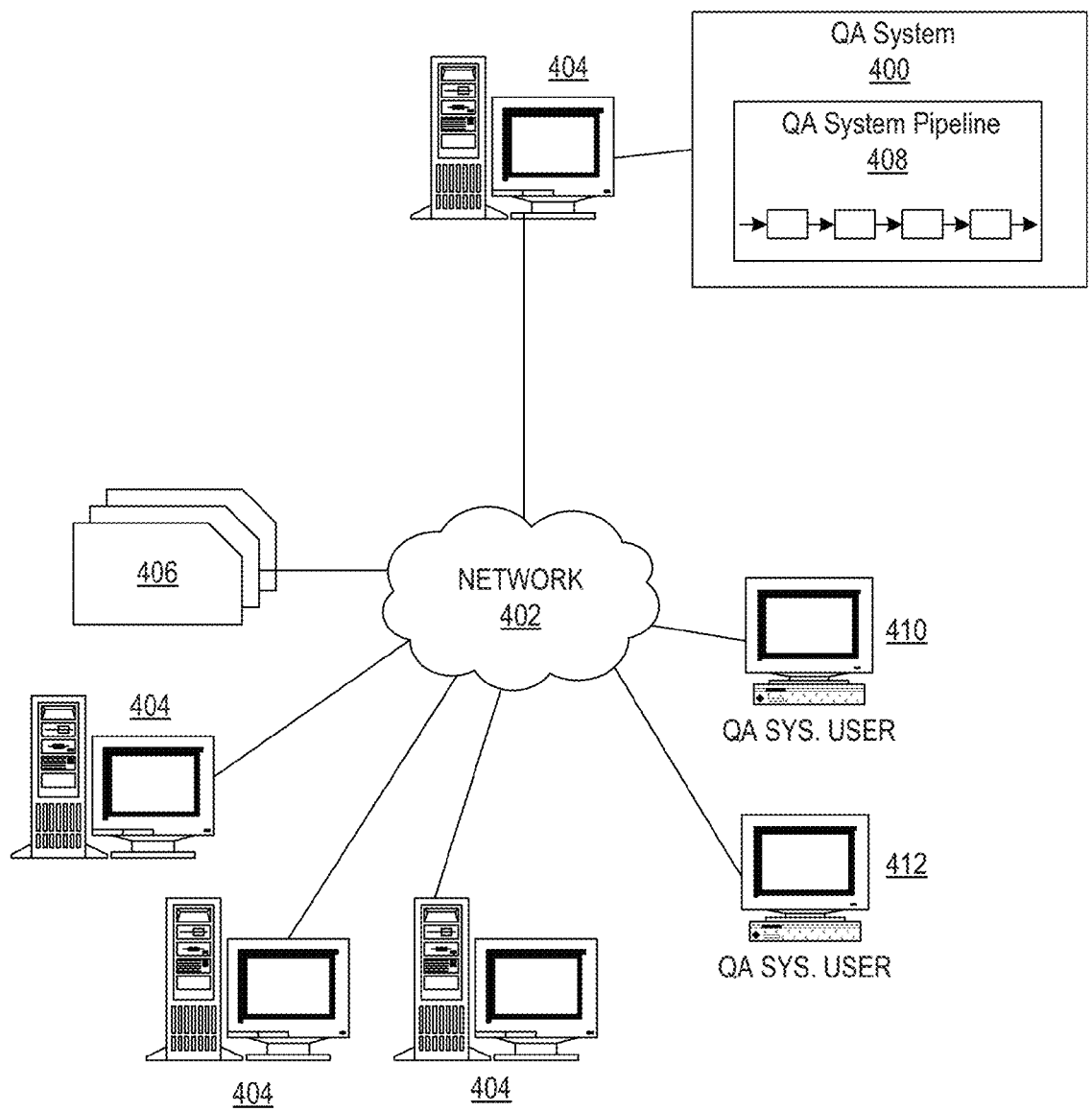
FIG. 4 depicts a schematic diagram of one illustrative embodiment of a question/answer creation (QA) system in a computer network.
Figure 5:
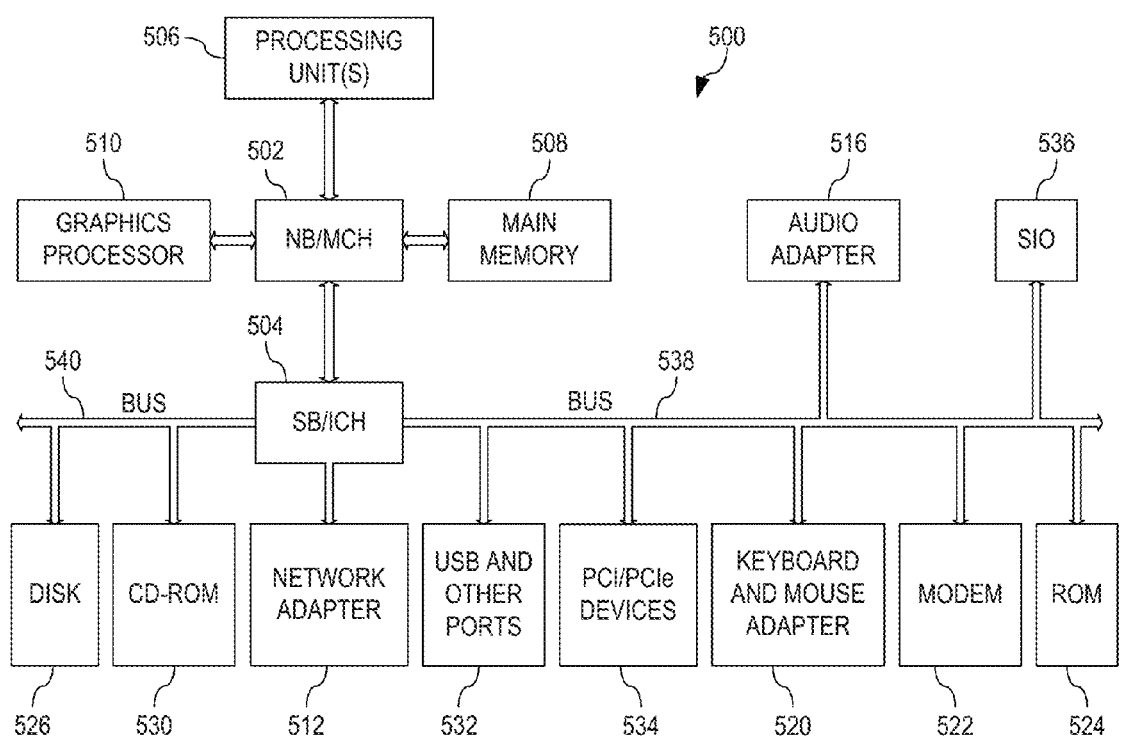
FIG. 5 is a block diagram of an example data processing system in which aspects of the illustrative embodiments may be implemented.
Figure 6:
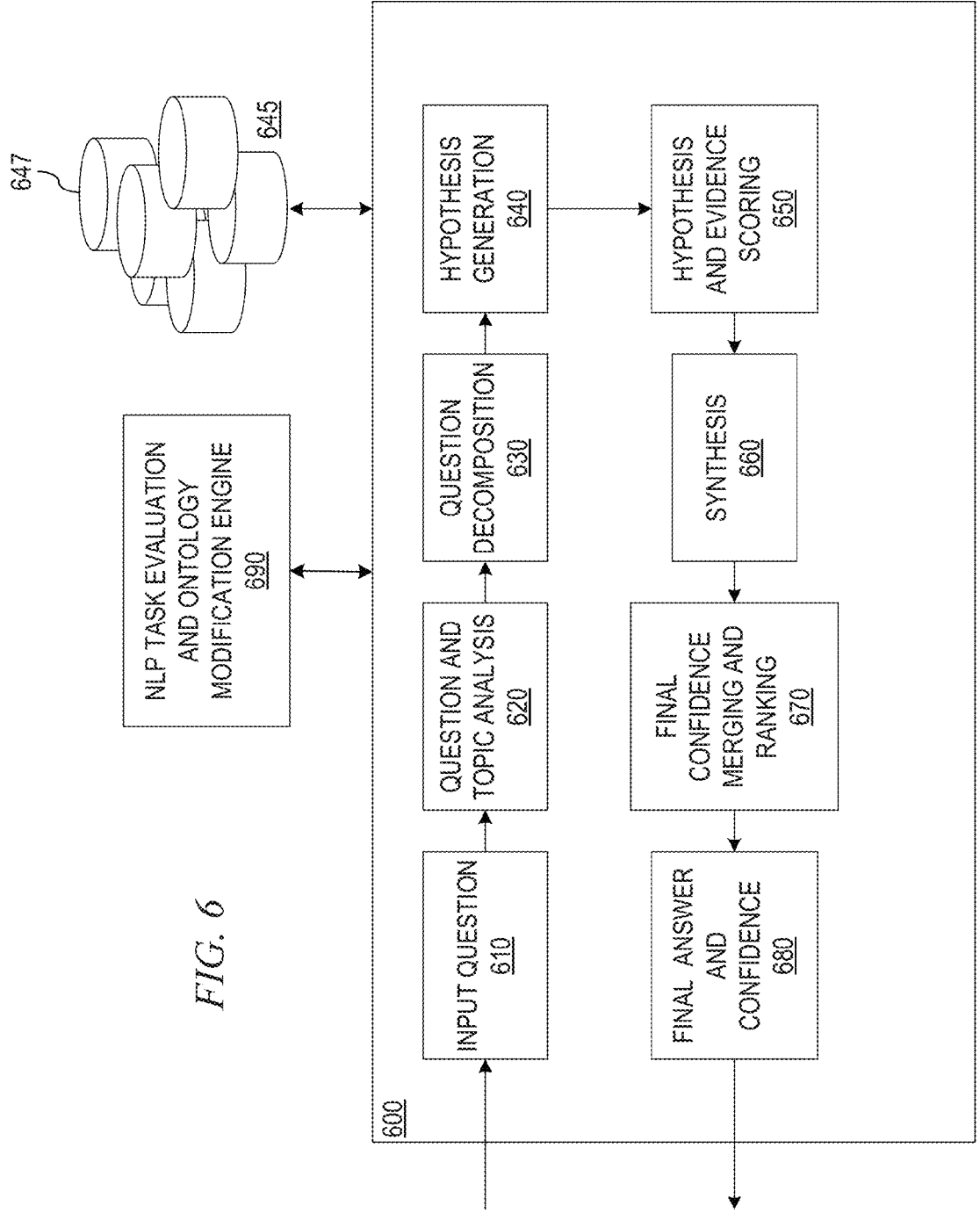
FIG. 6 illustrates a QA system pipeline for processing an input question in accordance with one illustrative embodiment.

Thus, the illustrative embodiments may be utilized in many different types of data processing environments in which Natural Language Processing (NLP) is implemented. One particular environment in which the mechanisms of the illustrative embodiments are especially well suited is the environment of a Question and Answer (QA) system, such as the IBM Watson™ QA system. While a QA system will be assumed to be the implementation for the remainder of this description, it should be appreciated that this is only an example implementation and is not meant to state or imply any limitation as to the types of NLP tasks or systems in which the illustrative embodiments may be implemented. However, assuming an implementation of the mechanisms of the illustrative embodiments with a QA system, FIGS. 4-6 are provided hereafter as an example QA system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to evaluating and modifying an ontology functionality with regard to specific NLP tasks.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 4-6 are only examples and are not intended to state or imply any limitation with regard to the type of QA mechanisms with which the illustrative embodiments may be implemented. Many modifications to the example QA system shown in FIGS. 4-6 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 4 depicts a schematic diagram of one illustrative embodiment of a question/answer creation (QA) system 400 in a computer network 402. One example of a question/answer generation which may be used in conjunction with the principles described herein is described in U.S. Patent Application Publication No. 2011/0125734, which is herein incorporated by reference in its entirety. The QA system 400 may be implemented on one or more computing devices 404 (comprising one or more processors and one or more memories, and potentially any other computing device elements generally known in the art including buses, storage devices, communication interfaces, and the like) connected to the computer network 402. The network 402 may include multiple computing devices 404 in communication with each other and with other devices or components via one or more wired and/or wireless data communication links, where each communication link may comprise one or more of wires, routers, switches, transmitters, receivers, or the like. The QA system 400 and network 402 may enable question/answer (QA) generation functionality for one or more QA system users via their respective computing devices 410-412. Other embodiments of the QA system 400 may be used with components, systems, sub-systems, and/or devices other than those that are depicted herein.

The QA system 400 may be configured to implement a QA system pipeline 408 that receive inputs from various sources. For example, the QA system 400 may receive input from the network 402, a corpus of electronic documents 406, QA system users, or other data and other possible sources of input. In one embodiment, some or all of the inputs to the QA system 400 may be routed through the network 402. The various computing devices 404 on the network 402 may include access points for content creators and QA system users. Some of the computing devices 404 may include devices for a database storing the corpus of data 406 (which is shown as a separate entity in FIG. 4 for illustrative purposes only). Portions of the corpus of data 406 may also be provided on one or more other network attached storage devices, in one or more databases, or other computing devices not explicitly shown in FIG. 4. The network 402 may include local network connections and remote connections in various embodiments, such that the QA system 400 may operate in environments of any size, including local and global, e.g., the Internet.

In one embodiment, the content creator creates content in a document of the corpus of data 406 for use as part of a corpus of data with the QA system 400. The document may include any file, text, article, or source of data for use in the QA system 400. QA system users may access the QA system 400 via a network connection or an Internet connection to the network 402, and may input questions to the QA system 400 that may be answered by the content in the corpus of data 406. In one embodiment, the questions may be formed using natural language. The QA system 400 may interpret the question and provide a response to the QA system user, e.g., QA system user 410, containing one or more answers to the question. In some embodiments, the QA system 400 may provide a response to users in a ranked list of candidate answers.

The QA system 400 implements a QA system pipeline 408 which comprises a plurality of stages for processing an input question, the corpus of data 406, and generating answers for the input question based on the processing of the corpus of data 406. The QA system pipeline 408 will be described in greater detail hereafter with regard to FIG. 6.

In some illustrative embodiments, the QA system 400 may be the IBM Watson™ QA system available from International Business Machines Corporation of Armonk, N.Y., which is augmented with the mechanisms of the illustrative embodiments described hereafter. The IBM Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 5 is a block diagram of an example data processing system in which aspects of the illustrative embodiments may be implemented. Data processing system 500 is an example of a computer, such as server 404 or client 410 in FIG. 4, in which computer usable code or instructions implementing the processes for illustrative embodiments of the present invention may be located. In one illustrative embodiment, FIG. 5 represents a server computing device, such as a server 404, which, which implements a QA system 400 and QA system pipeline 408 augmented to include the additional mechanisms of the illustrative embodiments described hereafter.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 may be connected to SB/ICH 504.

An operating system runs on processing unit 506. The operating system coordinates and provides control of various components within the data processing system 500 in FIG. 5. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 500.

As a server, data processing system 500 may be, for example, an IBM® eServer™ System p® computer system, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and may be loaded into main memory 508 for execution by processing unit 506. The processes for illustrative embodiments of the present invention may be performed by processing unit 506 using computer usable program code, which may be located in a memory such as, for example, main memory 508, ROM 524, or in one or more peripheral devices 526 and 530, for example.

A bus system, such as bus 538 or bus 540 as shown in FIG. 5, may be comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, may include one or more devices used to transmit and receive data. A memory may be, for example, main memory 508, ROM 524, or a cache such as found in NB/MCH 502 in FIG. 5.

Those of ordinary skill in the art will appreciate that the hardware depicted in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

FIG. 6 illustrates a QA system pipeline for processing an input question in accordance with one illustrative embodiment. The QA system pipeline of FIG. 6 may be implemented, for example, as QA system pipeline 408 of QA system 400 in FIG. 4. It should be appreciated that the stages of the QA system pipeline shown in FIG. 6 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 6 may be augmented, for example, in one or more of the stages to implement the improved mechanism of the illustrative embodiments described hereafter, additional stages may be provided to implement the improved mechanism, or separate logic from the pipeline 600 may be provided for interfacing with the pipeline 600 and implementing the improved functionality and operations of the illustrative embodiments As shown in FIG. 6, the QA system pipeline 600 comprises a plurality of stages 610-680 through which the QA system operates to analyze an input question and generate a final response. In an initial question input stage 610, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 600, i.e. the question and topic analysis stage 620, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 630 to decompose the question into one or more queries that may be applied to the corpora of data/information 645 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 645. That is, these various sources themselves, different collections of sources, and the like, may represent a different corpus 647 within the corpora 645. There may be different corpora 647 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 647 within the corpora 645.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 640 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 640, to generate hypotheses for answering the input question. These hypotheses are also referred to herein as "candidate answers" for the input question. For any input question, at this stage 640, there may be hundreds of hypotheses or candidate answers generated that may need to be evaluated.

The QA system pipeline 600, in stage 650, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 660, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 670 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 680, a final answer and confidence score, or final set of candidate answers and confidence scores, may be generated and output to the submitter of the original input question.

As shown in FIG. 6, in accordance the illustrative embodiments, the QA system may further comprise a NLP task evaluation and ontology modification engine 690 which may integrate with and operate on various ones of the above stages of the QA system pipeline 600. For example, the NLP task evaluation and ontology modification engine 690 may be used to improve the NLP task operations implemented during a corpus or corpora ingestion operation, question analysis operation in stage 620, evidence retrieval operation in stage 640, candidate answer scoring operation in stage 650, and/or the like. The NLP task evaluation and ontology modification engine 690 may comprise logic to implement the mechanisms and methodologies described above for evaluating the ontology used to perform the NLP task to determine if the ontology is providing the desired performance and, if not, modifying the ontology model to more likely provide the desired performance, e.g., desired accuracy, precision, recall, F-measure, or the like. The modifications may be performed in an iterative manner as previously described and the results of the NLP task generated for an iteration in which the performance metrics meet the requirements of one or more threshold performance values, may be output to further downstream stages of the QA system pipeline 600 for further processing in the manner previously described above.

Figure 7:
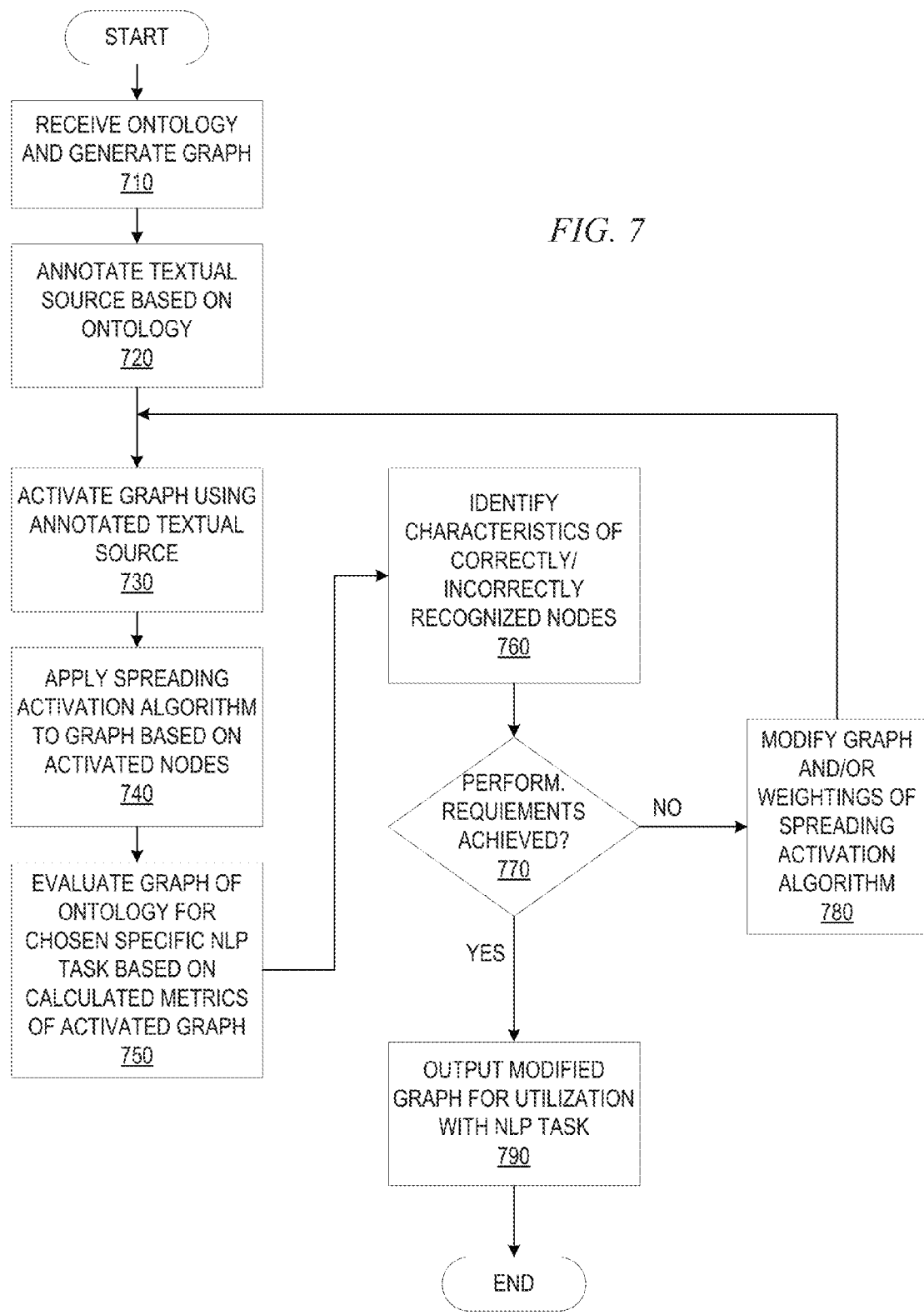
FIG. 7 is a flowchart outlining an example operation of the illustrative embodiments with regard to evaluating and modifying an ontology model for a specific NLP task.

FIG. 7 is a flowchart outlining an example operation of the illustrative embodiments with regard to evaluating and modifying an ontology model for a specific NLP task. The operation outlined in FIG. 7 may be implemented, for example, in hardware, software executed on hardware, or any combination of hardware and software, such as in a NLP task evaluation and ontology modification engine 690 or other logic engine used to evaluate and modify the operation of an NLP task.

As shown in FIG. 7, the operation starts by receiving an ontology and generating a graphical representation of the ontology, where nodes are instances of concepts or classes within the ontology and edges are instances of concept or class relationships (step 710). Instances of the ontology concepts/classes are annotated in a textual source (step 720) and the graphical representation of the ontology is activated with the annotated textual source (step 730). The activation of the graphical representation comprises using the found nodes in the graphical representation as starting points from which to perform a spreading activation operation by spreading the activation signal in accordance with a spreading activation algorithm (step 740).

The graphical representation of the ontology is then evaluated with regard to a chosen specific NLP task, such as a domain-specific word-sense disambiguation (WSD) NLP task for example, leveraging existing metrics such as accuracy, precision, recall, F-measure and the like (step 750). The characteristics, e.g., number of in-bound links, number of out-bound links, identification of 0-link nodes, etc. of nodes in the graphical representation which are determined to be usually correctly or incorrectly recognized by the NLP task are examined using a set of graphical metrics or performance thresholds (step 760). A determination is made as to whether the nodes of the graphical representation meet the requirements set forth by the performance thresholds, e.g., a performance metric has a value equal to or above a corresponding threshold value (step 770). If not, the graphical representation, and/or the weightings associated with the spreading activation signals for various concepts/classes, are modified so as to attempt to reach the desired performance requirements (step 780). The operation then returns to step 730 where the graph is re-evaluated using the modifications performed in step 780. If the performance meets the desired performance in step 770, then the modified graphical representation is output for utilization with the NLP task (step 790).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for modifying an ontology for use with a natural language processing (NLP) task, the method comprising:

obtaining, by the data processing system, a model of the ontology, wherein the model of the ontology comprises nodes representing concepts of the ontology and edges between nodes representing relationships between associated nodes of the ontology;

performing, by the data processing system, a spreading activation operation on the model of the ontology, wherein the spreading activation operation matches a portion of a textual source to a matching node of the model and identifies related nodes to the matching node through edges of the model associated with the matching node to thereby generate an activation network;

evaluating, by the data processing system, the activation network with regard to a chosen NLP task to determine a performance metric for the NLP task associated with the nodes of the model; and in response to results of the evaluating indicating that performance of a node does not meet a desired performance for the NLP task, modifying at least one of the model or a configuration of the activation network based on results of the evaluation of the activation network.

2. The method of claim 1, wherein the chosen NLP task is one of word sense disambiguation, named entity detection, named entity resolution, named entity inference, or word sense inference.

3. The method of claim 1, wherein modifying the configuration of the activation network comprises modifying one or more weight values associated with a portion of the activation network.

4. The method of claim 1, wherein evaluating the activation network with regard to the chosen NLP task comprises performing differential analysis of characteristics of nodes in the model that are determined to be relatively higher performing in the activation network and nodes in the model that are determined to be relatively lower performing in the activation network.

5. The method of claim 4, wherein the characteristics of a node comprise at least one of a number of in-bound links of the node, a number of out-bound links of the node, or an identification of the node as being an isolated node.

6. The method of claim 1, wherein evaluating the activation network with regard to the chosen NLP task comprises performing static analysis of a subset of nodes in the model, identified in the activation network, to identify characteristics of the subset of nodes, and wherein modifying at least one of the model or the activation network comprises modifying a starting weight for a spreading activation signal of the spreading activation operation, for a node in the subset of nodes.

7. The method of claim 1, wherein evaluating the activation network with regard to the chosen NLP task comprises comparing the activation network to a golden standard corpus of text content to identify nodes in the activation network corresponding to instances of terms in the golden standard corpus of text and evaluating characteristics of the identified nodes to determine modifications to be performed to at least one of the model or the activation network.

8. The method of claim 1, wherein performing, by the data processing system, a spreading activation operation on the model comprises annotating the textual source using a predetermined lexicon data structure and utilizing the annotated textual source to identify nodes in the model to activate as part of the spreading activation signal, and wherein the textual source comprises a set of test text for use in testing the ontology.

9. The method of claim 1, wherein the performance metric for the NLP task comprises at least one of a precision metric, a recall metric, an F-measure metric, or an accuracy metric.

10. The method of claim 1, further comprising:
performing the NLP task utilizing the modified graph representation or activation network.

11. A computer program product comprising a computer readable storage medium having a computer readable program stored therein, wherein the computer readable program, when executed on a computing device, causes the computing device to:

obtain a model of an ontology, wherein the model of the ontology comprises nodes representing concepts of the ontology and edges between nodes representing relationships between associated nodes of the ontology;

perform a spreading activation operation on the model of the ontology, wherein the spreading activation operation matches a portion of a textual source to a matching node of the model and identifies related nodes to the matching node through edges of the model associated with the matching node to thereby generate an activation network;

evaluate the activation network with regard to a chosen NLP task to determine a performance metric for the NLP task associated with the nodes of the model; and in response to results of the evaluating indicating that performance of a node does not meet a desired performance for the NLP task, modify at least one of the model or a configuration of the activation network based on results of the evaluation of the activation network.

12. The computer program product of claim 11, wherein the chosen NLP task is one of word sense disambiguation, named entity detection, named entity resolution, named entity inference, or word sense inference.

13. The computer program product of claim 11, wherein the computer readable program further causes the processor to modify the configuration of the activation network at least by modifying one or more weight values associated with a portion of the activation network.

14. The computer program product of claim 11, wherein the computer readable program further causes the processor to evaluate the activation network with regard to the chosen NLP task at least by performing differential analysis of characteristics of nodes in the model that are determined to be relatively higher performing in the activation network and nodes in the model that are determined to be relatively lower performing in the activation network.

15. The computer program product of claim 14, wherein the characteristics of a node comprise at least one of a number of in-bound links of the node, a number of out-bound links of the node, or an identification of the node as being an isolated node.

16. The computer program product of claim 11, wherein the computer readable program further causes the processor to evaluate the activation network with regard to the chosen NLP task at least by performing static analysis of a subset of nodes in the model, identified in the activation network, to identify characteristics of the subset of nodes, and wherein the computer readable program further causes the processor to modify at least one of the model or the activation network at least by modifying a starting weight for a spreading activation signal of the spreading activation operation, for a node in the subset of nodes.

17. The computer program product of claim 11, wherein the computer readable program further causes the processor to evaluate the activation network with regard to the chosen NLP task at least by comparing the activation network to a golden standard corpus of text content to identify nodes in the activation network corresponding to instances of terms in the golden standard corpus of text and evaluating characteristics of the identified nodes to determine modifications to be performed to at least one of the model or the activation network.

18. The computer program product of claim 11, wherein the computer readable program further causes the processor to perform a spreading activation operation on the model at last by annotating the textual source using a pre-determined lexicon data structure and utilizing the annotated textual source to identify nodes in the model to activate as part of the spreading activation signal, and wherein the textual source comprises a set of test text for use in testing the ontology.

19. The computer program product method of claim 11, wherein the performance metric for the NLP task comprises at least one of a precision metric, a recall metric, an F-measure metric, or an accuracy metric.

20. An apparatus comprising:
a processor; and
a memory coupled to the processor, wherein the memory comprises instructions which, when executed by the processor, cause the processor to:
obtain a model of an ontology, wherein the model of the ontology comprises nodes representing concepts of the ontology and edges between nodes representing relationships between associated nodes of the ontology;
perform a spreading activation operation on the model of the ontology, wherein the spreading activation operation matches a portion of a textual source to a matching node of the model and identifies related nodes to the matching node through edges of the model associated with the matching node to thereby generate an activation network;
evaluate the activation network with regard to a chosen NLP task to determine a performance metric for the NLP task associated with the nodes of the model; and
in response to results of the evaluating indicating that performance of a node does not meet a desired performance for the NLP task, modify at least one of the model or a configuration of the activation network based on results of the evaluation of the activation network.

* * * * *